United States Patent [19]

Germerdonk et al.

[11] 4,152,399
[45] May 1, 1979

[54] PROCESS AND APPARATUS FOR THERMALLY PURIFYING EFFLUENT GASES

[75] Inventors: Rolf Germerdonk, Kaiserslautern; Werner Hüning, Odenthal-Hahnenberg; Rudolf Cirkel, Cologne; Günter Brinkmann, Tönisvorst, all of Fed. Rep. of Germany

[73] Assignees: Bayer Aktiengesellschaft, Leverkusen; Kleinewefers Industrie Companie GmbH, Krefeld, both of Fed. Rep. of Germany

[21] Appl. No.: 822,966

[22] Filed: Aug. 8, 1977

[30] Foreign Application Priority Data

Aug. 18, 1976 [DE] Fed. Rep. of Germany ....... 2637169

[51] Int. Cl.² .................... B01D 53/34; F23G 7/06
[52] U.S. Cl. .................... 423/210; 110/210; 165/81; 422/168; 431/5; 432/72
[58] Field of Search ............. 423/210, 245; 23/266, 23/277 C; 165/81-83; 110/8 A; 431/5; 432/72; 422/168

[56] References Cited

U.S. PATENT DOCUMENTS

| | | | |
|---|---|---|---|
| 2,152,266 | 3/1939 | McNeal | 165/81 X |
| 3,251,656 | 5/1966 | Edwards | 23/277 C |
| 3,443,548 | 5/1969 | Rich et al. | 165/81 X |
| 3,670,810 | 6/1972 | Allen | 165/81 X |
| 3,867,102 | 2/1975 | Csathy | 23/277 C |

OTHER PUBLICATIONS

Awerbuch, "Abluftverbrennung Ohne Sonderausgaben", Wasser-Luft und Betrieb, vol. 11, No. 9, 1974, pp. 494-497.

Primary Examiner—Earl C. Thomas
Attorney, Agent, or Firm—Sprung, Felfe, Horn, Lynch & Kramer

[57] ABSTRACT

In the thermal purification of effluent gases charged with noxious substances by burning them with air at high temperatures, the improvement which comprises drawing the effluent gases charged with noxious substances through a zone established by a device which provides protection against back-firing and a combustion zone which is resistant to bursts of pressure of up to about 10 bars, and burning the effluent gases in the combustion zone at a temperature of about 800° to 1000° C. To carry out the process there is provided an apparatus comprising a back-firing safety device followed by a heat exchanger and then a combustion chamber. Components of the heat exchanger are made resistant to pressures of up to about 10 bars and the safety device prevents back-firing to the plant wherein the effluent gases are produced.

2 Claims, 3 Drawing Figures

PROCESS AND APPARATUS FOR THERMALLY PURIFYING EFFLUENT GASES

In various industrial plants, effluent gases are produced which are charged with combustible noxious substances which are foreign to air, for example solvent vapors such as for example hexane, toluene, benzene, kerosine, ether, alcohol and/or combustible gases such as for example hydrogen or acetylene. These effluent gases must be purified before they can enter the atmosphere.

Processes for treating effluent gases by absorption, condensation and oxidation are known. Of these known processes, the oxidation process is the only one which actually destroys the noxious substances since all the other processes merely transfer the problem from the effluent air to elsewhere. Since catalytic oxidation of effluent gas is susceptible to failure, an oxidation process is increasingly being used in which thermal purification of effluent gases charged with noxious substances is carried out by burning the effluent in a burner with additional fuel or the noxious substances are oxidized.

In a known installation for thermally purifying effluent gas effluent gases charged with noxious substances leave the plant via a ventilator, pass through a heat exchanger into a combustion chamber and thence pass through the heat exchanger again into a chimney leading into the environment. The effluent gases are pre-heated by the heat exchanger in countercurrent to the combustion gases in order to save energy. The heat exchanger may optionally be dispensed with where complete oxidation can be carried out in the combustion chamber without pre-heating the waste gases charged with noxious substances.

The above described known process only functions when the concentration of the noxious substance in the waste gas lies beneath the lower explosive limit. If the concentration of the combustible noxious substances happens to exceed the explosive limit, even if only for a short while, an immediate danger of explosion arises in the combustion installation and furthermore, by backfiring, also in the plant. In this case, the ventilator and/or heat exchanger and/or combustion chamber may act as potential sources of fire. An inflammable mixture of gases will for example definitely be ignited by the flame or by the glowing fractions in the combustion chamber. Back-firing against the direction of flow of the effluent gas then triggers an explosion, characterized by a substantial increase in pressure which endangers the environment, in the effluent gas supply pipe, and this increase in pressure may be propagated into the plant.

Therefore, according to the state of the art, the inflammability of the outgoing air must be reliably avoided by continuously diluting the effluent gases with fresh air or by subjecting the effluent gases to a preliminary treatment to reduce their noxious substance content.

However, since possible inflammablility of the effluent gas cannot be reliably avoided with the known measures alone, the object of the present invention is to provide an installation for purifying waste gas thermally. In this installation, the purifying installation breaks down in the event of an explosion but there is no external nuisance and the operating personnel are not endangered.

The present invention therefore relates to a process for thermally purifying effluent gases charged with noxious substances by burning them with air at high temperatures, characterized in that effluent gases charged with noxious substances are drawn through a zone which is determined by a device which provides protection against back-firing and a combustion zone, which is resistant to bursts of pressure of up to about 10 bars, and are burnt in the combustion zone at temperatures of from about 800° to 1000° C., and auxiliary fuel is introduced as required for maintaining this temperature range.

The present invention also provides an apparatus for thermally purifying effluent gases in a combustion chamber having an effluent gas supply pipe and optionally an auxiliary fuel supply pipe, wherein a device for protection against back-firing is located in the effluent gas supply pipe and a heat exchanger, combustion chamber and ventilator with a suction blower are connected to the device providing protection against backfire, wherein the apparatus is resistant to bursts of pressure up to about 10 bars from the device for protection against back-firing up to and including the combustion chamber.

The invention also provides a special heat exchanger which is particularly suitable for the practice of the novel process.

The invention will be further described with reference to the accompanying drawings, wherein.

Figure 1:
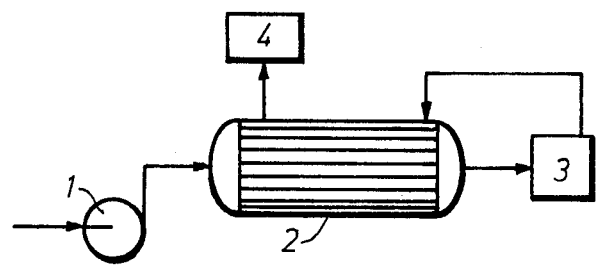
FIG. 1 is a flow sheet of a known apparatus for carrying out thermal purification of effluent gases.

Referring now more particularly to the drawing, in the known apparatus of FIG. 1 the reference characters identify the following structures:

1. Ventilator
2. Heat exchanger
3. Combustion chamber
4. Chimney for waste gas

The contaminated effluent gases pass through the ventilator 1, are pre-heated in heat exchanger 2 and pass into combustion chamber 3 where hot gases are produced and serve as the heating medium in exchanger 2. The gases then leave through the chimney 4. As noted previously, this construction permits an explosion to be carried back, even to the plant, so it is necessary to operate below the lower explosive limit.

Figure 2:
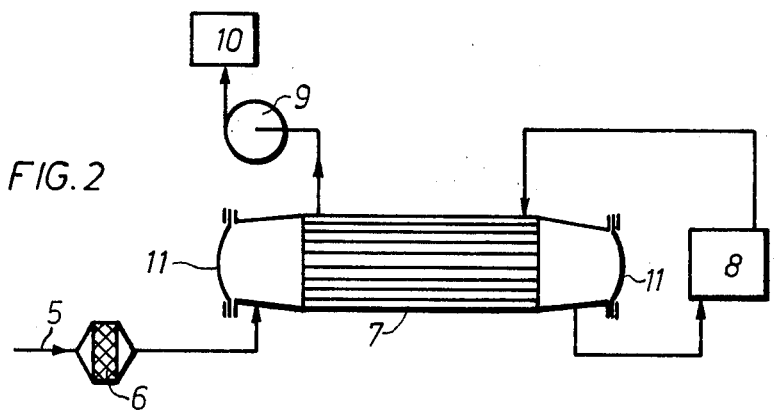
FIG. 2 is a flow sheet of a new apparatus for carrying out thermal purification of effluent gases in accordance with the present invention.

FIG. 2 schematically shows an apparatus in accordance with the present invention which can be operated in the explosive range. The reference numerals have the following significance:

5. Effluent gas supply pipe;
6. Device for protection against back-firing;
7. Heat exchanger;
8. Combustion chamber;
9. Ventilator;
10. Chimney for waste gas;
11. Device for protection against breakage.

The effluent gas firstly passes via the effluent gas supply pipe 5 via a device providing protection against back-firing, for example a fire screen or a submersion safety device 6, through a heat exchanger 7 and into the combustion chamber 8. From there it passes back via the heat exchanger and the ventilator 9, which has a suction draught blower, through the chimney 10 and into the open. The section between the device 5 providing protection against back-firing and the combustion chamber 8, in which an explosion is possible, has a resistance to bursts of pressure up to 10 bars, so that an explosion having a 7 to 10 fold rise in pressure is not destructive. This resistance to bursts of pressure applies to the device providing protection against back-firing, the heat exchanger, the combustion chamber and the piping between them.

In order to reduce the material load of the heat exchanger at high temperatures in the event of an explosion, relatively large breaking safety devices, made for example of precious metal, may be installed at the ends of the heat exchanger to limit the maximum explosive pressure to about 3 to 4 bars.

In the pressure resistant section in which explosions may occur, an explosion is also prevented from turning into a detonation with bursts of pressure up to 100 bars by means of the structural configuration. This is achieved by keeping the explosive volume as small as possible and by avoiding the formation in the piping of straight lengths of more than 5 times the diameter of the tube.

The effluent gas charged with noxious substances is burnt at temperatures of about 800° to about 1000° C. in the combustion chamber. If auxiliary fuel is required for maintaining these temperatures, this fuel is introduced separately (by means not shown) into the combustion chamber.

Combustion preferably takes place in combustion chambers which operate with extremely high turbulence and preferably through a swirling section with high frequency pulsation. Combustion chambers of this type are known under the name of "combustors," in particular "pulsating combustors," and described for example in "Wasser-Luft and Betrieb" 18 (1974), No. 9, pages 494 to 497. Natural gas or oil, in particular waste oil, may be used as the auxiliary fuel.

Figure 3:
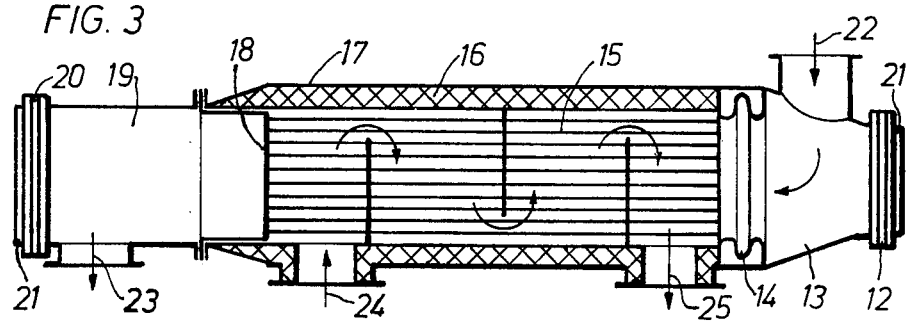
FIG. 3 is a side view, partly in section, of a heat exchanger particularly suitable for use in the apparatus of FIG. 2.

FIG. 3 shows a particularly suitable heat exchanger for practice of the present invention. In this figure the reference numerals have the following significance:

12. Breaking security device
13. Effluent gas inlet dome
14. Bellows expansion joint for a bank of tubes
15. Bank of tubes
16. Internal insulation
17. Heat exchanger casing
18. Tube plate
19. Deflection chamber
20. Breaking security device
21. Retaining flange
22. Effluent gas inlet
23. Effluent gas pre-heated to combustion chamber
24. Smoke gas from the combustion chamber
25. Smoke gas to the chimney.

The following features are characteristic of the heat exchanger according to the invention:

(a) bursting plate 90° to direction of explosive thrust arranged at the effluent gas inlet;

(b) effluent gas inlet dome resistant to explosive pressures of up to 10 bars;

(c) bellow expansion joint of the bank of tubes pressure-resistant up to 10 bars;

(d) individual tubes in the bank of tubes pressure-resistant up to 10 bars at temperatures up to 600° C.;

(e) lining of the heat exchanger inner chamber with a compressed resilient light insulating layer based on ceramic fiber;

(f) heat exchanger casings pressure-resistant up to 10 bars; the temperature drops through the internal lining of the casing and normal steels may be used;

(g) tube plate pressure-resistant up to 10 bars at temperatures of up to 700° C.;

(h) deflection chamber pressure resistant up to 10 bars at temperatures of up to 500° C.;

(i) bursting plate 90° to the direction of explosive thrust, arranged at the deflection of the effluent gas;

(j) diameter of the bursting plates equal to the diameter of the tube plates, thus providing unobstructed pressure release.

The heat exchanger according to the invention has a number of advantages over known heat exchangers. The above-mentioned features make this heat exchanger resistant to bursts of pressure at average material temperatures of 600° or 700° C., i.e., the smoke gas temperature may be about 800° to 1000° C.

It will be appreciated that the instant specification and examples are set forth by way of illustration and not limitation, and that various modifications and changes may be made without departing from the spirit and scope of the present invention.

What is claimed is:

1. In the thermal purification of effluent gases charged with combustible noxious substances, wherein the composition of the effluent gas may happen to exceed the explosive limit, by drawing the effluent gas through a zone established by a device which provides protection against back-firing and burning them with air at high temperatures, the improvement which comprises preheating the effluent gas after having passed the device for protection against back-firing by indirect heat-exchange with purified gas after combustion, and burning the effluent gas in a combustion zone at a temperature of about 800°-1000° C., the combustion zone, heat-exchange zone and connecting tubes therebetween being resistant to bursts of pressure of up to 10 bars, the connecting tubes having straight lengths of at most 5× the diameter of the tubes and the heat-exchange zone containing bursting plates which, in the event of an explosion, break down thereby avoiding backward propagation of pressure.

2. In an apparatus for thermally purifying effluent gases, comprising a combustion chamber, means for supplying effluent gases to said chamber, a heat exchanger for preheating the effluent gases with purified gases after combustion, and means for venting purified gases after heat exchange, the improvement which comprises a backfiring safety device located upstream of the heat exchanger, the heat exchanger being formed of normal steel and comprising inlet and outlet domes, a casing between said domes internally insulated with a compressed layer of ceramic fiber, a bellows expansion joint connecting said outlet dome with said casing, a plurality of tubes extending longitudinally within said casing, a tube plate adjacent the outlet dome except for passage of gas through said tubes, and a pair of bursting plates respectively adjacent the inlet and outlet domes at an angle of 90° to the direction of explosive thrust, the circumferences of the bursting plates corresponding to those of the tube plates so as to provide unobstructed pressure release, the domes, heat exchanger casing, tubes, tube plates and bellows joint being resistant to pressure of up to about 10 bars at temperatures up to 600° C.

* * * * *

UNITED STATES PATENT AND TRADEMARK OFFICE
CERTIFICATE OF CORRECTION

PATENT NO. : 4,152,399
DATED : May 1, 1979
INVENTOR(S) : Rolf Germerdonk

It is certified that error appears in the above-identified patent and that said Letters Patent are hereby corrected as shown below:

Column 4, line 58, after "outlet dome" insert --sealing off the outlet dome--.

Signed and Sealed this

Sixteenth Day of September 1980

[SEAL]

Attest:

SIDNEY A. DIAMOND

Attesting Officer     Commissioner of Patents and Trademarks